Oct. 23, 1951   J. W. DOWN ET AL   2,572,454
APPARATUS FOR DISPLAYING PICTORIAL REPRESENTATIONS
Filed July 30, 1948

James W. Down
Daniel R. Miller
INVENTORS

BY *Clarence A. O'Brien*
*and Harvey B. Jacobson*
Attorneys

Patented Oct. 23, 1951

2,572,454

UNITED STATES PATENT OFFICE 2,572,454

APPARATUS FOR DISPLAYING PICTORIAL REPRESENTATIONS

James W. Down and Daniel R. Miller, Washington, D. C.; said Miller assignor to said Down Application July 30, 1948, Serial No. 41,508

1 Claim. (Cl. 40—68)

This invention relates to a method and apparatus for mounting pictorial representations in a novel and unique display fashion and has for its primary object to mount miniature photographs in a body of transparent material and to pivotally support the body of material on a horizontal support.

Another important object of this invention is to mount a plurality of miniature photographs in the sides of a multi-sided block of transparent material, the photographs being mounted in a clearly exposed and visual fashion and being protectively and permanently secured in the block, free from exposure to the elements, such as dust or the like.

Another important object of this invention, parallel with the object of mounting the miniature photographs in a transparent block, is to provide a supporting device for the block, so that the same may be pivotally supported on a horizontal support and thus enhance its inherent value as a display medium.

These and ancillary objects, to become apparent upon a perusal of the following description, are attained by this invention, a preferred embodiment of which is set forth in the following description and illustrated in the accompanying drawings, wherein.

Since the advent, in a public sense, of plastic materials, there have arisen various means for utilizing the inherent advantages and possibilities of the materials. Devices of all types and descriptions have been brought forth to serve utilitarian and novel purposes. One of the many fields in which plastics have been extensively employed with advantage is the display field, wherein plastic novelties of all descriptions have been made known. However, the use, in this field, has been limited to the formation of supporting structures and the like. This invention encompasses the use of a block of plastic material not only as a novel supporting means for pictorial representations but also as a protective medium to retain the representations in a clear unspoiled fashion. This is accomplished by excluding the elements that work destruction on photographs and the like, such as dust, dirt and sunlight. It is the principal aim and purpose of this invention to employ a multi-sided block of plastic material for displaying a plurality of miniature pictorial representations or photographs. This aim is carried out by forming shallow diametrically enlarged recesses or openings in each side of the block of material and inserting therein the miniature photographs with transparent plugs pressed on the face of the photographs so that the same are retained free from the destruction of dust, sunlight and the like. Paralleling this aim, it is another important purpose of this invention to support the transparent block, having the miniature photographs enclosed in its sides in a pivotal manner, so that the block may be spun, and regardless of the position of the observer, a side, having a picture therein, can be observed. Thus, an observer always sees a picture, regardless of the position of the block.

Figure 2:
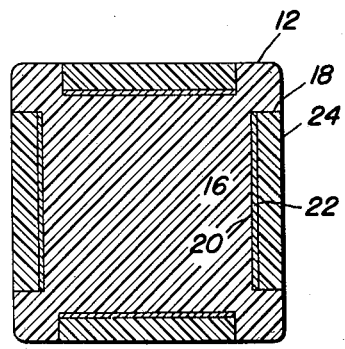
Figure 2 is a transverse sectional view taken substantially on the plane of line 2—2 through the block shown in Figure 1; and, Figure 3 is an enlarged sectional view taken substantially on line 3—3 of Figure 1.

In this respect, attention is directed to Figure 2 of the drawings, which discloses a cross sectional view of a block of transparent plastic material. Of course, the plastic material that can be employed can be of a thermo-plastic type, such as cellulose acetate, cellulose nitrate or the like, which are transparent, water-proof and have good ageing properties. The particular shape and size of the block is not deemed material, since various shapes can be employed to good advantage, dependent upon the number and type of pictorial representations, which are desired to be displayed. For the purpose of teaching the novel method employed, the block of plastic material is shown in the drawings as comprising a cube 12, having sides 14. Using conventional means, such as a disc drill or the like, a shallow recess or opening 16 is formed centrally in each of the sides 14. Of course, the circular side walls of the openings 16 and the end wall 20 thereof are suitably buffed so as to remove any scratches, uneven depressions or the like, which would mar the transparency of the block.

Figure 1:
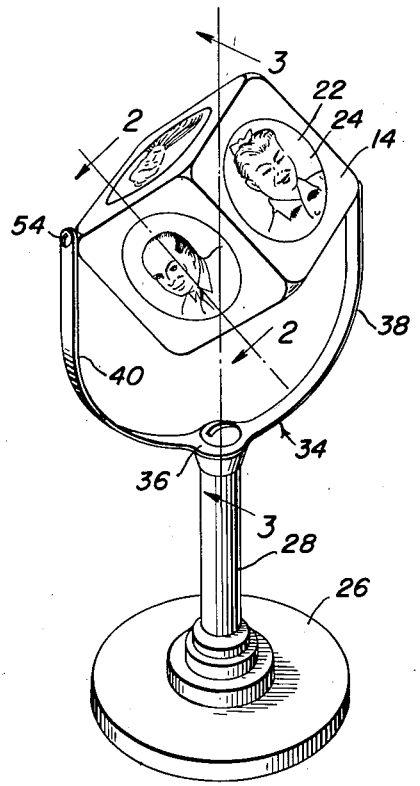
Figure 1 is a view in perspective of a transparent picture-carrying block, formed in accordance with the principles of this invention and showing the same pivotally supported by a supporting structure within the purview of this invention.

After forming the shallow diametrically enlarged openings 16, miniature pictorial representations, similar to the miniature photographs 22 shown in Figure 1, are pressed into the openings. The back of the photographs are seated against the wall 20 of the openings, with the face of the photograph directed outwardly. Circular plugs of a diameter equal to the diameter of the openings 16 and of a width substantially the same as the depth of the openings 16 are provided to cover the exposed face of the photographs. It is to be noted that the plugs 24 are of a material similar to the block and, of course, are translucent. The plugs 24 are pressed into the openings 16 and are frictionally retained therein so as to fit over the photographs in a protective closure fashion.

The outer surfaces of the plugs 24 are then buffed or otherwise treated, so that the outer surfaces of the plugs are flush with the exterior surface of the sides. The finished article, as seen in Figure 1, has a miniature photograph 22 centrally disposed in the sub-surface of each of the six sides 14.

Figure 3:
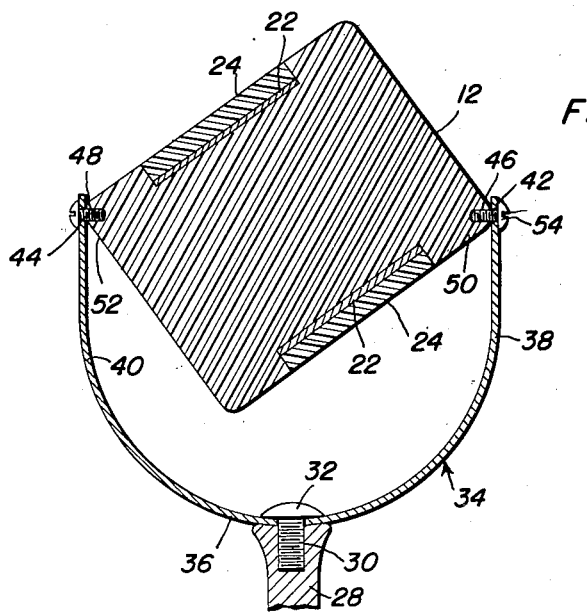

To further enhance the novelty and usefulness of the display block, thus formed, it has been proposed to pivotally mount the same on a supporting structure, whereby the block may be rotated about a horizontal axis to selectively expose its various sizes at a given point. The means provided for carrying out this proposal comprises a base 26, having a centrally-disposed vertically-extending rod or bar 28. An internally-threaded bore 30 is vertically disposed in the upper portion of the rod 28 and in association with a complementary attaching member, such as a set screw 32 or the like, serves to detachably support a supporting frame 34 for the block, as seen in Figure 3.

The supporting frame 34 comprises a U-shaped strip including a centrally apertured body portion 36 and a pair of vertically-extending opposed arms 38 and 40. The arms 38 and 40 have transversely opposing aligned apertures 42 and 44 disposed adjacent their extremities. Threaded bores 46 and 48 are disposed transversely in a pair of opposed corners 50 and 52 of the block. Suitable pivotal elements, such as set screws or the like, having threaded shanks are provided to pivotally mount the block within the supporting arms 38 and 40. In this respect, the set screws 54 are inserted through the apertures 42 and 44 and have their threaded shanks received in the threaded bores 46 and 48 in the block.

Thus, with reference to Figure 1, it can be appreciated that by gripping a corner of the block or the like, the block can be rotated on the arms 38 and 40 and will successively expose each of its photograph carrying signs.

However, it is to be understood that many variations may be practiced, since the size and shape of the block may be altered and the supporting structure may be modified, since the only important requisite is that the block is pivotally supported on a horizontal support. Thus, many variations and changes may be carried out within the spirit of this invention and the scope of the appended claim.

Having described the invention, what is claimed as new is:

A display device for pictorial representations comprising a multi-sided solid block having shallow recesses formed in each of the sides thereof, pictorial representations pressed in said openings, transparent retaining plugs frictionally seated in said openings and having their outer surfaces of the sides flush with the surfaces of the block and means for pivotally mounting said block on a horizontal support.

JAMES W. DOWN.
DANIEL R. MILLER.

REFERENCES CITED

The following references are of record in the file of this patent:

UNITED STATES PATENTS

| Number | Name | Date |
|---|---|---|
| 254,945 | Fest | Mar. 14, 1882 |
| 811,432 | Peake | Jan. 30, 1906 |
| 1,144,173 | Corcoran | June 22, 1915 |
| 1,444,963 | Fay | Feb. 13, 1923 |
| 1,554,191 | Alexander | Sept. 22, 1925 |
| 1,579,573 | Stuckey | Apr. 6, 1926 |
| 1,618,359 | Vitolo | Feb. 22, 1927 |
| 1,740,845 | Tilbe | Dec. 24, 1929 |
| 1,918,243 | Bergaud | July 18, 1933 |
| 2,214,030 | Pereles | Sept. 10, 1940 |
| 2,306,939 | Ferris | Dec. 29, 1942 |

FOREIGN PATENTS

| Number | Country | Date |
|---|---|---|
| 160,249 | Great Britain | Mar. 15, 1921 |